United States Patent [19]

Forrester et al.

[11] 4,391,515
[45] Jul. 5, 1983

[54] OPTICAL TRANSMITTER/RECEIVER APPARATUS SHARING COMMON OPTICS

[75] Inventors: Howard M. Forrester, Ridgecrest; John R. Crisler, China Lake, both of Calif.

[73] Assignee: The United States of America as represented by the Secretary of the Navy, Washington, D.C.

[21] Appl. No.: 261,341

[22] Filed: May 7, 1981

[51] Int. Cl.³ .............................................. G01C 3/08
[52] U.S. Cl. ............................................ 356/5; 356/4
[58] Field of Search ........................ 356/4, 5, 342, 369, 356/371

[56] References Cited

U.S. PATENT DOCUMENTS

| | | | |
|---|---|---|---|
| 2,270,535 | 1/1942 | Land | 362/19 |
| 3,401,590 | 9/1968 | Massey | 356/5 |
| 3,503,682 | 3/1970 | Botcherby | 356/4 |
| 3,669,540 | 6/1972 | Rattman et al. | 356/4 |
| 3,715,165 | 2/1973 | Smith | 356/120 |
| 3,721,500 | 3/1973 | Fugitt | 356/118 |
| 3,915,572 | 10/1975 | Orloff | 356/106 R |
| 3,927,619 | 8/1975 | Stevens | 356/118 |
| 3,927,947 | 12/1975 | Kasi | 356/117 |
| 3,977,789 | 8/1976 | Hunter | 356/120 |
| 4,025,194 | 5/1977 | Teppo | 356/5 |
| 4,036,557 | 6/1977 | Christensen | 356/28 |

OTHER PUBLICATIONS

H. J. Cerritsen, Infrared Polarizer RCT TN No. 608, Mar. 1965.

*Primary Examiner*—Sal Cangialosi
*Assistant Examiner*—M. Gordon
*Attorney, Agent, or Firm*—R. F. Beers; W. T. Skeer

[57] ABSTRACT

Optical detection apparatus is provided which includes a coherent light source for generating a beam of coherent light. The apparatus further includes a unitized or discrete optical component which receives the generated beam, and projects light thereof which has a particular polarization characteristic into a specified environment. The optical component also functions to receive or absorb light from the environment which has the particular polarization characteristic, and to directably reflect light from the environment which does not have the polarization characteristic. A lens or other light collecting device focuses light reflected by the discrete optical component upon a light detection element. A light conducting path is provided between the coherent light source and the light detecting element to enable generated coherent light to be mixed with the reflected light upon the light detecting element to provide data signals which indicate the presence of an object in the environment.

1 Claim, 4 Drawing Figures

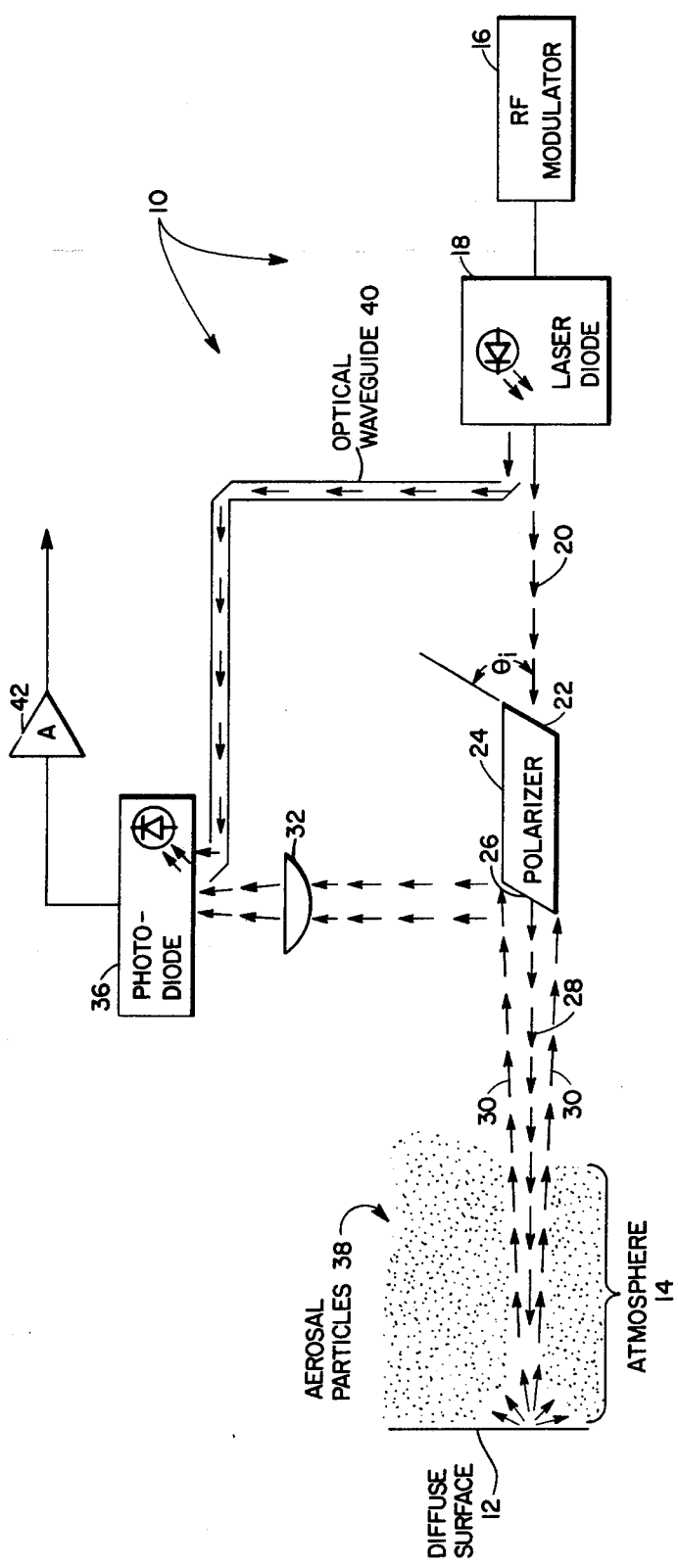

OPTICAL TRANSMITTER/RECEIVER APPARATUS SHARING COMMON OPTICS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention disclosed and claimed herein generally pertains to the field of active optical detection systems, that is, to systems which project light into an environment and then detect projected light which has been reflected back from an object in the environment, the presence of the object in the environment being thereby indicated. More particularly, the invention pertains to systems of the above type wherein a single optical component is employed to both transmit light into the environment and receive light back from the environment, while maintaining transmitted and received light in isolation from one another. Even more particularly, the invention pertains to apparatus of the above type wherein only a single polarizer device is required to maintain isolation between transmitted or projected light and received light, i.e., to prevent cross-coupling therebetween, while detecting the presence of an object in an environment or providing other information related to the object.

In the past, active optical systems for detecting objects or bodies in an environment, such as an atmospheric environment, have generally required two different subsystems, a transmission system to project light into the environment, and a reception system to receive projected light which has been reflected back from an object. Separate transmission and reception systems have been necessary to avoid the phenomenon of cross-coupling, which occurs when projected light travels from the light projector to the receiver, without first being reflected from an object in the environment. The ambient or background level of light detected by the receiver may thereby be made very high, so that receiver sensitivity is substantially diminished. Cross-coupling may occur as the result of backscatter, that is, the reflection of projected light back toward the receiver from fog or rain droplets.

In their invention, the applicants disclose apparatus which is capable of employing a single optical system to both project light into an environment and receive light back from the environment which has been reflected from an object or body therein, which is the subject of detection. At the same time, projected light from the receiver which has not been reflected from the object is prevented from reaching the light detection element of the system. Applicants thereby enable a significant reduction to be made in the cost, complexity, and number of components required for an active optical detection system. In Applicants' system, for example, only a single window or port is required to both project light into, and receive light from an environment which is being monitored for the presence of objects or bodies. Also, only a single light detection element is required to provide a signal which indicates the presence of an object in the environment in response to received light. In addition, in a system structured according to Applicants' invention, it is unnecessary to spatially separate the light projecting and receiving components thereof to avoid cross-coupling.

SUMMARY OF THE INVENTION

The present invention provides optical detection apparatus which includes means for generating a beam of coherent light, and which further includes a discrete optical component receiving the coherent light beam. The discrete optical component projects light of the beam which has a particular polarization characteristic into a specified environment, and simultaneously therewith, receives, or provides a window to, light from the environment which has the particular polarization characteristic. Light from the environment which does not have the particular polarization characteristic is reflected by the component toward a lens means, which focuses the reflected light upon a light detection element. Means for mixing light of the generating means with reflected light upon the light detection element is provided to generate a data signal which indicates the presence of an object in the environment. The data signal may also provide useful information related to a detected object, such as its range from the optical detection apparatus.

Preferably, the optical component comprises means for both projecting light into, and accepting light from the environment which is polarized in a particular plane, and for reflecting light therefrom which is not polarized in the particular plane. Preferably also, the optical component is provided with an inner surface which is so oriented toward the light beam generating means that the beam impinges upon the inner surface at a predetermined angle of incidence. The component is further provided with an outer surface oriented toward the environment for enabling light from the environment which impinges upon the outer surface, and which is polarized in the particular plane, to be admitted into the optical component. Other light impinging upon the outer surface is reflected thereby.

In a preferred embodiment of the invention, the discrete optical component comprises a Brewster angle polarizer having an inner port and an outer port. The inner port comprises a planar surface which is oriented toward the light beam generating means so that the coherent light beam therefrom impinges upon the inner port at an angle of incidence which is equal to Brewster's angle. The outer port is oriented toward the environment to project light thereinto which is linearly polarized in a particular plane, and light from the environment which impinges upon the outer surface is received into the polarizer only if it is likewise polarized in the particular plane. Other light impinging upon the outer port from the environment is reflected, collected by the lens means, and focussed upon the light detection element.

OBJECTS OF THE INVENTION

An object of the present invention is to provide an improved active system for detecting objects or bodies in an environment, wherein the system employs a single set of optic elements for both projecting light into and receiving light from the environment.

Another object is to provide a system of the above type which prevents cross-coupling, that is, which prevents light projected by the system from being sensed or detected by the system unless it has encountered and has been reflected from an object which is the subject of system detection.

Another object is to provide a system of the above type which includes a device, such as a Brewster angle polarizer, to enable light to be projected into an environment, to illuminate an object therein, which has a particular polarization characteristic, and to discriminate between light received from the environment which has and does not have the particular polarization characteristic.

Another object is to enable significant reductions in the cost, complexity and number of components required for an active optical detection system.

These and other objects of the invention will become more readily apparent from the ensuing specification when taken together with the drawings.

BRIEF DESCRIPTION OF THE DRAWINGS

FIG. 1 is a schematic diagram showing an embodiment of the invention.

FIGS. 2-4 are diagrams which show several types of Brewster angle polarizer devices which may alternatively be employed in the embodiment of FIG. 1.

DETAILED DESCRIPTION OF THE PREFERRED EMBODIMENT

Referring to FIG. 1, there is shown an active optical detection system 10, which is structured in accordance with the principles of the present invention. System 10 is deployed to detect or monitor a diffuse object or body 12, such as an aircraft, which may be present in an environment such as an atmospheric environment 14. System 10 may be employed simply to detect the presence or absence of an object 12 in environment 14, or may additionally be employed to determine the range of object 12 from system 10 or the velocity at which object 12 is moving through environment 14.

FIG. 1 shows system 10 provided with an RF modulator 16 which couples a driving current to a laser diode 18. Laser diode 18 is thereby caused to project a narrow beam of coherent light 20, such as laser light of infrared wavelength, to an inner port or window 22 of a polarizer device 24, such as a Brewster's angle polarizer. As is well known in the art, if beam 20 impinges upon port 22 at an angle of incidence $\theta_i$ which is equal to Brewster's angle, some of the light of beam 20 will pass through the polarizer, and will emerge from an outer port or window 26. Such emerging light will be highly polarized in a plane 28. The polarized light will illuminate object 12, if object 12 is present in the environment, and some of the light will be reflected back toward polarizer 24, such reflected light becoming unpolarized or diffused. Projected light which is reflected back toward polarizer 24 is represented in FIG. 1 by reference numeral 30. Since such light is no longer polarized, only a portion thereof is able to pass through port 26 into polarizer 24. The remainder is reflected by port 26 toward a light collecting lens 32, and is focused thereby upon the light sensitive surface 34 of a light detection element, such as a photodiode 36.

Collecting lens 32 is oriented in relationship with outer port 26 so that only light which is reflected by outer port 26 will be received thereby. However, any light which is linearly polarized in plane 28 is not reflected by port 26, but rather, passes through the polarizer 24. Consequently, projected light which is backscattered, that is, which retains its polarization characteristic after being reflected back toward polarizer 24 by aerosal particles 38, such as rain or fog, never reaches collecting lens 32. Instead, it passes through the polarizer and is discarded (absorbed). Backscattered light will be sufficiently reduced that detection will not occur, thereby providing discrimination between light backscattered by aerosals and that backscattered by solid, diffuse surfaces.

Referring further to FIG. 1, there is shown an optical waveguide, or light conducting path 40, conveying light generated by laser diode 18 to light sensitive surface 34. The light generated by laser diode 18 is thereby mixed with the light collected by lens 32, the light from the laser diode providing a reference local oscillator. In response thereto, detector 36 generates a signal, which is amplified by a video or doppler amplifier 42. Light 30, comprising as aforementioned light which is projected by system 10 into environment 14, and then reflected back thereto from an object 12, is displaced in a time phase relationship with the light generated by laser diode 18, by an amount which is proportional to the distance between system 10 and object 12. The output signal of amplifier 42 may therefore be processed to provide the distance or range of object 12. Also, by comparing phase relationships between light 30 and light from laser diode 18 in accordance with techniques which are well known in the art, doppler frequency can be determined, to provide a measure of the velocity of object 12 if object 12 is moving through environment 14.

Referring to FIG. 2, there is shown a Brewster's angle polarizer 24 formed of six light transmissive plates 44 arrayed in spaced apart stacked relationship. Each plate has parallel faces, and the faces of the plates are in parallel relationship to one another.

Referring to FIG. 3, there is shown a six plate polarizer formed of plates 44, wherein the plates are arranged in two groups.

Referring to FIG. 4, there is shown a six plate Brewster angle polarizer formed of two groups of wedge-shaped plates 46.

Obviously, many modifications and variations of the present invention are possible in the light of the above teachings. It is therefore to be understood that within the scope of the appended claims the invention may be practiced otherwise than as specifically described.

We claim:

1. Optical detection apparatus comprising:
   means for generating a beam of coherent light;
   a discrete optical polarizing component including a plurality of wedge shaped light transmissive plates arranged in two groups each group being arranged in a spaced apart stack,
   one surface of one of said wedge shaped plates from one of said groups being positioned to intercept the light from said coherent light generating means at a predetermined angle of incidence,
   another surface of another of said wedge shaped plates being arranged to receive incoming light reflected from an object in an ambiant environment having particular polarization characteristics;
   a light detection element;
   a lens positioned between said discrete optical component upon said light detection element; and
   means for transmitting light from said coherent light generating means to said light detecting element, whereby it is mixed with the coherent light from said discrete optical component to produce a data signal.

* * * * *